United States Patent Office 3,448,167
Patented June 3, 1969

3,448,167
SPECIFIC OLEFIN SYNTHESIS VIA REACTION OF YLIDE AND ONIUM SALT INTERMEDIATES
Isaac Dvoretzky, Moraga, and Frank D. Mango, Oakland, Calif., assignors to Shell Oil Company, New York, N.Y., a corporation of Delaware
No Drawing. Filed July 16, 1964, Ser. No. 383,250
Int. Cl. C07c 3/10, 11/00
U.S. Cl. 260—683.15       13 Claims

ABSTRACT OF THE DISCLOSURE

Specific olefins are synthesized by reaction of an olefin with an acid, contacting the product with a basic heteroatom compound to form a heteroatom onium salt which in the presence of a base is converted to an ylide intermediate which reacts with additional salt to form a new or expanded onium salt. Decomposition of the thus produced onium salt yields an olefin and a heteroatom-acid salt.

---

This invention relates to the production of olefins via heteroatom onium intermediates. More specifically, it relates to the formation of acyclic olefins, preferably branched, having at least two carbon atoms per molecule from reagents each of which has fewer carbon atoms than the product olefin, and to the formation of cyclic olefins from reagents having the same number of carbon atoms as the product olefins, via heteroatom onium and heteroatom ylide intermediates.

The importance of lower-molecular-weight olefins in chemical and petroleum technology has been realized for many years. These compounds are basic building blocks in polymerization and alkylation systems, as well as being important starting materials or intermediates for the production of alcohols, ketones, acids, alkyl halides, and a number of other organic compounds. Longer-chain olefins (10–18 C's) are important because of their use in the manufacture of lubricants, synthetic detergents, corrosion inhibitors, etc. Still longer-chain olefins, such as those obtained from wax cracking or from polymerization of smaller olefins, are used as building blocks for oil dispersants or are hydrogenated to produce oil-range paraffins.

In the past, these olefins have been produced in a variety of ways. Dehydration of alcohols, halogenation-dehydrohalogenation of paraffins, and oligomerization of olefins of low molecular weight have generally proved quite costly. Although both thermal and catalytic cracking of higher-mol-weight feedstocks are relatively inexpensive, these processes are difficult to control and have very poor product selectivity, especially at practical conversions. In order to obtain any specific olefin or olefin fraction, the cracked product must be subjected to extensive further processing.

The present invention provides a practical method, through some entirely new chemistry, for synthesizing specific branched olefins substantially without catalyst consumption and formation of byproducts. More specifically, the invention provides a process for producing branched olefins from olefins or from addition products of acids and olefins, the starting materials having fewer carbon atoms per molecule than the olefin product. In a preferred aspect, the over-all reaction of the process of the invention is the specific dimerization of a monoolefin. In another aspect of the invention, a diolefin is converted to a cyclic monoolefin of the same carbon number.

In view of the complexity of the subject matter, the invention is initially described in terms of dimerization of a single monomer; however, this description should not be construed as limiting.

In accord with a preferred aspect of the invention, the reaction product of an olefin of $n$ carbon atoms and an acid is contacted with a basic heteroatom compound to form a heteroatom onium salt. In the presence of base, this salt is converted to an intermediate (an ylide) which reacts with additional salt to form a new onium salt with an alkyl substituent having $2n$ carbon atoms. The new onium salt then decomposes in a standard Hofmann elimination to yield an olefin of $2n$ carbon atoms and a heteroatom-acid salt. The term "onium salt" as used in this context means a derivative of a heteroatom-containing organic compound formed by the addition of another organic compound RY resulting in the formation of a new covalent bond between the group R and the heteroatom, a positive formal charge residing on the heteroatom with a corresponding negative charge on the group Y. The term "ylide" as used herein means a derivative of a heteroatom-containing organic compound in which the heteroatom is both covalently and ionically bound to a carbon atom of another organic group, the positive formal charge of the ionic bond residing on the heteroatom and the negative formal charge residing on the carbon atom. The terms "acid" and "base" as used herein mean "proton donor" and "proton abstractor," respectively.

In terms of specific steps, a preferred aspect of the invention may be described as follows:

(1)      olefin + acid ⟶ substituted alkane (2)      substituted alkane + heteroatom compound ⟶ onium salt (3)      onium salt $\xrightarrow{\text{base}}$ ylide + acid (4)      ylide + onium salt ⟶ enlarged onium salt + heteroatom compound (5)      enlarged onium salt $\xrightarrow{\text{base}}$ olefin dimer + heteroatom compound + acid Reactions 1, 2, 3, and 5, individually and broadly, are known reactions familiar to a skilled chemist. The first reaction can, of course, be omitted by using a substituted alkane as a starting material. Similarly steps 1 and 2 can be omitted by starting with an onium salt.

The most important reactions in this process are steps 3 and 4, the over-all effect being an enlargement of the alkyl substituent of the onium salt.

The invention is more easily understood by means of an illustrative example, shown below. The acid used is a hydrohalogen compound, HX, where X is a halogen, the heteroatom compound is pyridine, and the olefin is propylene.

(1)    $CH_2=CHCH_3 + HX \rightarrow CH_3CHXCH_3$ (2)

(3)

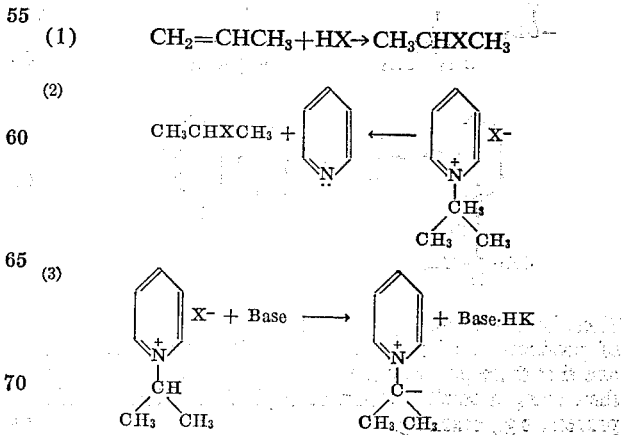

(4)

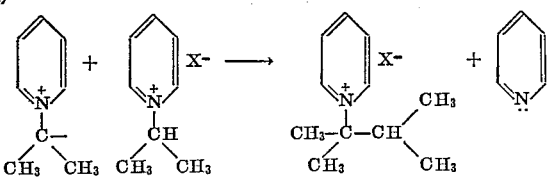

(5)

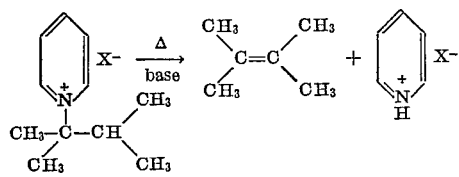

In step (1), propylene and HX are reacted, using well known techniques, to produce isopropyl halide. This step is obviated if alkyl halides are used as starting materials. Step (2) illustrates the reaction of the halide with pyridine to form an onium salt, N-isopropylpyridinium halide, which, in step (3), is attacked by a base to form an ylide, pyridinium dimethylmethylide. The next step, (4), is nucleophilic attack by the ylide carbon atom on a second molecule of the onium salt to form the new desired onium salt having a larger alkyl substituent, N-isohexylpyridinium halide. Finally, the isohexylpyridinium compound decomposes to yield to product olefin and pyridinium halide (step 5). The net hydrocarbon reaction is therefore simply

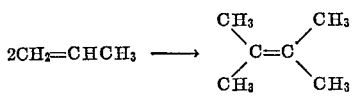

with all of the pyridine and, optionally, all of the acid and base, being regenerated and recycled.

Thus, a very valuable olefin, 2,3-dimethylbutene-2, has been synthesized from propylene, a cheap, available raw material. The process of the invention yields a very specific product, eliminating the ultimate low yields and the need for further costly separation steps inherent in prior art processes.

Although the process of the invention is especially useful for dimerizing olefins, it can also be used for synthesizing olefins from two different starting materials. A variety of olefinic products may be formed by careful selection of reactants. For example, isopropyl pyridinium halide (obtained from isopropyl halide and pyridine) can be reacted with pyridinium methylide to produce, after the elimination step, isobutylene.

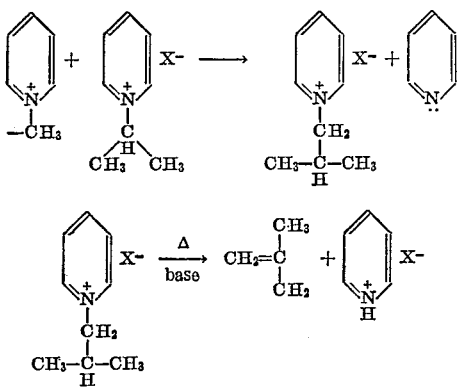

Therefore, it is readily apparent that a very wide range of products can be produced by this versatile process, and that these products are synthesized specifically rather than being a small fraction of a yield of a less specific process, e.g., cracking.

The net reaction of the process of the invention can be generalized as follows:

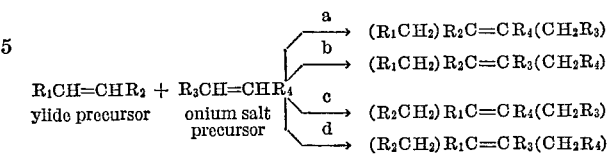

Assuming the initial process step is to react the olefin with a hydrogen halide, path $a$ is followed where the halide formed is a product of normal (Markownikoff) addition to the double bond; i.e., $$R_1CH=CHR_2 + HX \rightarrow R_1CH_2CHXR_2$$

the order of stability of the carbonium ion being $R_2C^+ > R_1C^+$. Similarly, path $b$ is followed where an ylide from a normal addition product adds to an onium salt derived from an abnormal addition product halide, and path $c$ is followed where an ylide from an abnormal addition product adds to an onium salt derived from a normal addition product halide. Path $d$ is followed where an ylide of an abnormal addition product halide adds to an onium salt derived from an abnormal addition product halide. $R_1$, $R_2$, $R_3$, and $R_4$ are selected from the group consisting of hydrogen and alkyl groups having from 1 to about 50, preferably from 1 to about 20 and more especially from 1 to about 5 carbon atoms per group. One carbon of the double bond may be without hydrogen (i.e., $R_1R_2=CHR_3$), provided the intermediate halide results only from abnormal addition. Where one alkyl group in the olefin is replaced by an aromatic group (Ar), the olefinic carbon bonded to the aliphatic groups need not be bonded to hydrogen, i.e., $R_1R_2C=CHAr$, because of the generally higher stability of benzylic carbonium ions. Also, either of the starting olefins may also be cyclic, e.g., cyclopentene or cyclohexene, subject to the same considerations regarding the attachment of hydrogen to the olefinic carbon atoms described above. In an especially preferred embodiment of the invention, a single olefin is used as a starting material; i.e., in the above formula, $R_1$ is the same as $R_3$, and $R_2$ is the same as $R_4$. The net result of this preferred embodiment is, of course, specific dimerization of the starting olefin.

As has been discussed, the initial step in the process of the invention is the reaction of an olefin with an acid, preferably a hydrogen halide, to form an alkyl halide. The step is obviated if an alkyl halide is used as a starting material. The alkyl halide need not be obtained from a reaction of an olefin and an acid; indeed, such a reaction is not possible when one of the starting materials is methyl halide, which is preferably prepared by the direct halogenation of methane. Methyl halide, when used as a starting material with an olefin, undergoes the sequence of reactions of the invention to provide the following general net reaction:

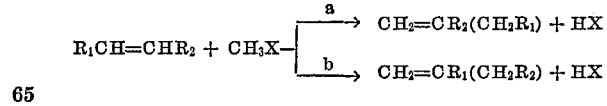

where $R_1$, $R_2$, and paths $a$ and $b$ are as above. Similarly, methyl halide can be used as the sole starting material to form ethylene: $2CH_3X \rightarrow CH_2=CH_2 + 2HX$. Thus it is desirable to have an alkyl substituent, attached to the heteroatom of the heteroatom compound, which has at least 1, preferably 1 to 50, especially 1 to 10 carbon atoms per group.

Some over-all reactions which may be accomplished via heteroatom and ylide intermediates in accord with the invention are as follows (HX represents a hydrogen halide):

SYNTHESIS OF TERMINAL OLEFINS

Monoolefins

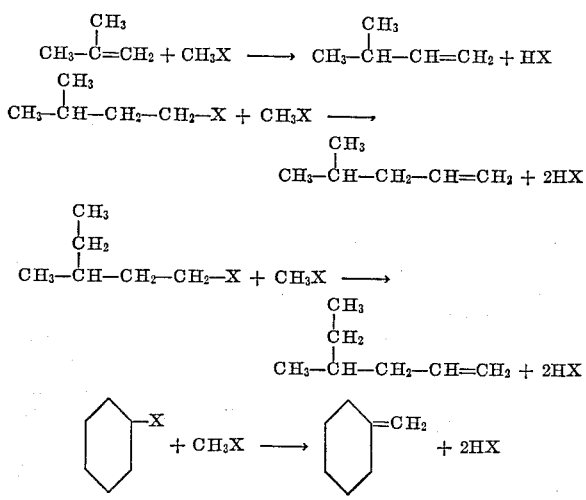

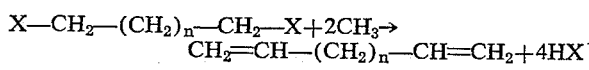

Diolefins $$X-CH_2-(CH_2)_n-CH_2-X + 2CH_3 \rightarrow$$
$$CH_2=CH-(CH_2)_n-CH=CH_2 + 4HX$$

where $n=0$ to 30 (e.g., biallyl where $n=2$).

SYNTHESIS OF INTERNAL OLEFINES

Linear $$2CH_3-(CH_2)_3-CH=CH_2 \rightarrow$$
$$CH_3-(CH_2)_4CH=CH-(CH_2)_4-CH_3$$

Branded

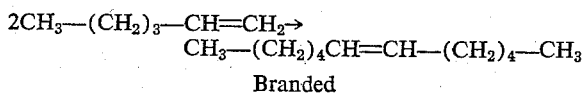

The process of the invention is not limited to producing olefins of higher molecular weight than the starting olefin, but may also be used to produce cyclic olefins from diolefins of the same carbon number. In this case, the acid is added to each double bond of the diolefin to form a bis-substituted alkane, and 2 moles of the heteroatom compound are reacted with the substituted alkane. Ylide formation occurs at only one point of attachment of heteroatom compound, with resulting intramolecular displacement of heteroatom compound to form an enlarged onium salt with a cyclic substituent. Higher ratios of intramolecular to intermolecular displacement (with resulting high product distribution ratios of cyclic olefin to olefin dimer) are achieved by operating the system at high dilution, i.e., at high ratios of solvent to reactants.

SYNTHESIS OF CYCLIC OLEFINS

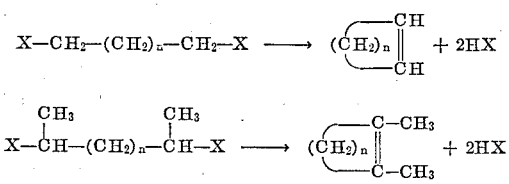

A substantial variety of non-consumed reagents is also contemplated for use in the process of the invention. Preferred heteroatom reagents are organic compounds containing only carbon, hydrogen, and a third element selected from the group consisting of groups V-A and VI-A of the Periodic Table, especially such compounds containing at least 1, preferably 1 to 2 rings. Preferred heteroatom compounds have from 2 to 30, preferably from 4 to 12 carbon atoms and from 1 to 3, preferably 1, heteroatom. Preferred heteroatoms are phosphorus, nitrogen, and sulfur, especially divalent sulfur, trivalent nitrogen and trivalent phosphorus. Compounds which do not contain active hydrogens, such as heterocyclic compounds possessing aromatic character, are especially preferred. Examples of suitable compounds are pyridine, trimethylamine, quinoline, triphenyl phosphine, thiophene, diphenylsulfide, diisopropyl sulfide, and dimethyl sulfide.

In general, any proton donor can be used for the acid. In particular, non-oxidizing compounds such as the hydrogen halides, especially HCl, HBr, and HI, or arylsulfonic acids having up to about 20 carbon atoms such as toluene-sulfonic acids are preferred. Alkanoic acids having up to about 30 carbon atoms, such as acetic, propionic, and butyric acids, are also appropriate. Strong oxidizing acids, such as sulfuric and nitric acids, may cause deleterious side reactions and are therefore less desirable.

The function of the base in the formation of ylide from onium salt (step 3) is to form the ylide intermediate by removing a proton from the carbon atom in the alkyl group adjacent to the heteroatom. Any base strong enough to abstract this proton is desirable; suitable examples include phenyl and butyl lithium, and alkali metal hydrides, hydroxides, alkoxides (e.g., potassium t-butoxide), organic amines having fewer than about 20 carbon atoms, etc. It is most desirable to choose a heteroatom compound which is sufficiently basic in nature that no additional base is required, i.e., the heteroatom compound itself removes a proton from the onium salt to form the ylide and also serves to decompose the enlarged onium salt. In this case the over-all reaction would be olefin → olefin dimer with no net consumption of heteroatom compound, acid, or base. The use of the heteroatom compound itself as the base is appropriate because the over-all stoichiometry of the system allows for an excess of the basic heteroatom compound over the acid, as follows:

3[heteroatom compound] + 2[acid] + 2[olefin] →
3[heteroatom compound] + 2[acid] + 1[olefin dimer]

The elimination of the enlarged alkyl substituent from the onium salt (step 5) is also base-catalyzed. One skilled in the art would readily be able to determine a proper base to allow this reaction to proceed; in general, the same base as is used to form the ylide is satisfactory.

The process of the invention, because of its flexibility, is adaptable to a wide variety of process schemes. The conditions and, indeed, the number of process steps necessary, will vary with the starting materials and catalytic reagents employed. The addition of acid to olefin to form a substituted alkane is a well known reaction which generally takes place readily at temperatures of —20° to about 150° C. when the materials are mixed in the liquid phase. If the heteroatom-acid salt formed in step 5 is used as the source of the acid, the salt can be decomposed to the heteroatom compound and the acid, or reacted directly with the olefin to form the anium salt. The reaction of a substituted alkane with a heteroatom compound to form an onium salt also proceeds readily in the liquid phase at temperatures of —20° to about 150° C., preferably moderate (e.g., room) temperatures. This reaction also is familiar to the skilled chemist.

The first of the two key reactions of the invention is the reaction of an onium salt with a base to form an ylide. This reaction proceeds in the liquid phase at a temperature from about —80° C. to 250° C., preferably 0° to 100° C., depending on the particular reagents involved.

The second key reaction, which is a novel reaction, involves the formation of the new onium salt with an enlarged alkyl substituent from the ylide and the original onium salt. This reaction takes place at a temperature from 0° to 250° C., preferably 100° to 200° C., in the liquid phase and at autogenous pressure.

The elimination of the alkyl group from the onium salt having the larger hydrocarbon substituent proceeds in the presence of base (which may be excess heteroatom compound) at slightly elevated temperatures, e.g., 20–250° C., depending on the nature of the heteroatom compound and the size of the alkyl group. This is a standard Hofmann elimination reaction, known to the skilled chemist. In many cases, this reaction will proceed immediately upon formation of the new onium salt, obviating the separation and separate processing of the new salt.

Each of the steps of the reaction can, of course, be carried out independently of the other steps. In a preferred aspect of the invention, the formation of ylide from onium salt and the subsequent reaction of ylide with onium salt to form a new onium salt with an enlarged alkyl group take place in the same reaction vessel. Under especially preferred conditions, the elimination of the enlarged hydrocarbon group will also proceed in the same vessel; generally, the use of a polar solvent as a reaction medium aids in attaining these conditions. Solvents which facilitate proton abstraction, e.g., dimethylsulfoxide, 1,4-dioxane, sulfolane, tetrahydrofuran, and the dimethyl ether of diethylene glycol, are preferred.

The following examples are intended to illustrate the invention and are not to be considered as limiting.

Example 1.—A slight excess of methylpyridinium bromide in 100 ml. pyridine was treated at 0° C. with freshly prepared (in diethyl ether) n-butyl lithium yielding a red solution of pyridinium methylide. To the ylide solution (about 25 percent w.) was added 25 grams of isopropylpyridinium bromide, and the resulting mixture was heated in a stirred, nitrogen-blanketed autoclave to 100° for 25 minutes, and then to 197° for 35 minutes. Isobutylene was recovered in the product.

Additional syntheses in accord with the invention are contemplated as follows:

Example 2.—One mole of pyridine and one mole of isopropyl bromide are added to 250 ml. of tetrahydrofuran in an autoclave. To the resulting mixture of solvent and isopropylpyridinium bromide is added 0.5 mole of n-butyl lithium. The contents are then stirred at 150° C. for one hour. After the mixture has been cooled to room temperature, another 0.5 mole of n-butyl lithium is added, and the temperature raised to 250° C. for one-half hour. The cooled liquid is then decanted from the insoluble lithium bromide, and the 2,3-dimethylbutene-2 product isolated by distillation.

Example 3.—One mole of isobutyl chloride and one mole of quinoline are added to 300 ml. of tert-butyl alcohol in an autoclave. After addition of one mole of potassium tert-butoxide, the system is heated with stirring at 140–150° C. for one-half hour. To the cooled mixture is added one mole of methyl iodide, and the temperature raised to 150° C. for one-half hour. After subsequent cooling and addition of one mole of potassium hydroxide, the mixture is heated again at 200° C. for one-half hour, and the product, 3-methylbutene-1, recovered by distillation.

Example 4.—1-bromohexane (2 moles) and dimethyl sulfide (2 moles) are added to 1 liter of diethylene glycol dimethyl ether in an autoclave, and the resulting solution treated with 1 mole of n-butyl lithium. The mixture is then heated to 150° C. and stirred at that temperature for one hour. The cooled product is treated with 1 mole of n-butyl lithium, heated to 200° C. for one-half hour, and the product, dodecene-6, distilled from the reaction mixture.

Example 5.—1,6 - dichlorohexane (1 mole) and diphenyl sulfide (2 moles) are added to 1 liter of 1,4-dioxane. To the resulting mixture, contained in an autoclave, is added 1 mole of phenyl lithium, and the system heated with stirring at 150° C. for one-half hour. The mixture is then cooled to room temperature, and 1 mole of potassium hydroxide added. After an additional period of heating at 150° C., with stirring, for one-half hour, the mixture is cooled, and the cyclohexene produced is purified by distillation.

We claim as our invention:

1. A process for increasing the carbon number of a hydrocarbon substituent on a heteroatom of an onium salt which comprises reacting at a temperature of from about 0 to about 250° C. (A) an onium salt, the anion component of which is derived from a non-oxidizing acid and the cation portion of which is derived from a first heteroatom compound having from 4 to about 12 carbon atoms and from 1 to 3 heteratoms selected from a group consisting of nitrogen and sulfur, said heteroatom compound having a hydrocarbon substitutent on a heteroatom of $m$ carbon atoms where $m$ is a number from 1 to about 10, with (B) on ylide of a second heteroatom compound having from 4 to about 12 carbon atoms and from 1 to 3 heteroatoms selected from a group consisting of nitrogen and sulfur, the negatively-charged hydrocarbon group on a heteroatom having $n$ carbon atoms where $n$ is a number from 1 to about 10, to form (C) an onium salt of the first heteroatom compound with a heteroatom-attached hydrocarbon group of $m+n$ carbon atoms.

2. The process of claim 1 wherein the first heteroatom compound and the second heteroatom compound are the same chemical compound.

3. A process for increasing the carbon number of an alkyl substituent on a heteroatom on an onium salt which comprises reacting at a temperature of from about 0 to about 250° C.
   (A) an onium salt the anion component of which is derived from a non-oxidizing acid selected from the group consisting of hydrohalogens, arylsulfonic acids having up to about 20 carbon atoms, and alkanoic acids having up to about 30 carbon atoms, and the cation portion of which is derived from a heteroatom compound having from 4 to about 12 carbon atoms and 1 heteroatom selected from a group consisting of nitrogen and sulfur, said heteroatom compound having a heteroatom-attached alkyl group of $m$ carbon atoms where $m$ is a number from 1 to about 10, with
   (B) an ylide of the same heteroatom compound having a heteroatom-substituted negatively-charged alkyl group of $n$ carbon atoms where $n$ is a number from 1 to about 10, to form
   (C) an onium salt with a heteroatom-attached alkyl group of $m+n$ carbon atoms.

4. A process for olefin synthesis which comprises reacting at a temperature of from about 0 to about 250° C. (A) an onium salt, the anion portion of which is derived from a non-oxidizing acid and the cation portion of which is derived from a heteroatom compound having from 4 to about 12 carbon atoms and from 1 to 3 heteroatoms selected from a group consisting of nitrogen and sulfur, said heteroatom compound having an alkyl substituent on a heteroatom of $m$ carbon atoms where $m$ is a number from 1 to about 10, with (B) an ylide of the same heteroatom compound having a heteroatom-substituted negatively-charged alkyl group of $n$ carbon atoms where $n$ is a number from 1 to about 10, to form (C) an onium salt with a heteroatom-attached alkyl group having $m+n$ carbon atoms, and decomposing onium salt (C) at a temperature of from 20 to about 250° C. in the presence of base to produce an olefin of $m+n$ carbon atoms.

5. The process of claim 4 wherein the heteroatom compound is selected from the group consisting of pyridine, trimethylamine, quinoline, thiophene, diphenylsulfide, diisopropyl sulfide, and dimethyl sulfide.

6. A process for olefin synthesis which comprises reacting at a temperature of from about 0 to about 250° C.
   (A) an onium salt the anion component of which is derived from a non-oxidizing acid selected from the group consisting of hydrohalogens, arylsulfonic acids having up to about 20 carbon atoms, and alkanoic acids having up to about 30 carbon atoms, and the cation portion of which is derived from a heteroatom compound having from 4 to about 12 carbon atoms and 1 heteroatom selected from a group consisting of nitrogen and sulfur, said heteroatom compound having a heteroatom-substituted alkyl group of $m$ carbon atoms where $m$ is a number from 1 to about 50, with (B) an ylide of the same heteroatom compound having a heteroatom-substituted negatively-charged alkyl group of $n$ carbon atoms where $n$ is a number from 1 to about 10 to form (C) an onium salt with a heteroatom-attached alkyl group of $m+n$ carbon atoms, and decomposing onium salt (C) at a temperature of from 20 to about 250° C. in the presence of base to produce an olefin of $m+n$ carbon atoms and a heteroatom salt.

7. A process for olefin synthesis which comprises
(1) reacting in the liquid phase at a temperature from −80 to 250° C. an onium salt (A) the anion component of which is derived from a non-oxidizing acid and the cation portion of which is derived from a first heteroatom compound having from 4 to about 12 carbon atoms and 1 heteroatom selected from a group consisting of nitrogen and sulfur, said heteroatom compound having a heteroatom-attached alkyl group of $n$ carbon atoms, where $n$ is a number from 1 to about 10, with a proton-abstracting base, thereby removing a proton from the heteroatom-attached carbon atom in the heteroatom-attached alkyl group, to form an ylide (B),
(2) reacting ylide (B) at a temperature of from 0 to about 250° C. with an onium salt (C), the anion component of which is derived from a non-oxidizing acid and the cation portion of which is derived from a second heteroatom compound having from 4 to about 12 carbon atoms and 1 heteroatom selected from a group consisting of sulfur and nitrogen, said onium salt having a heteroatom-attached alkyl group of $m$ carbon atoms, where $m$ is a number from 1 to about 10, to form an onium salt (D) of the first heteroatom compound with a heteroatom-attached alkyl group of $m+n$ carbon atoms, and
(3) decomposing onium salt (D) at a temperature from about 20° to about 250° C. in the presence of base to produce an olefin of $m+n$ carbon atoms and a heteroatom salt.

8. The process of claim 7 wherein the first heteroatom compound and the second heteroatom compound are the same chemical compound.

9. A process for olefin synthesis which comprises
(1) reacting a substituted hydrocarbon RY where R is a hydrocarbon group having $n$ carbon atoms where $n$ is a number from 1 to about 10 and Y corresponds to the anion of a non-oxidizing acid, with a first heteroatom compound having from 4 to about 12 carbon atoms and 1 heteroatom selected from a group consisting of nitrogen and sulfur, at a temperature of from −20° to 150° C. in the liquid phase to form an onium salt (A) having a heteroatom-attached hydrocarbon group of $n$ carbon atoms,
(2) reacting onium salt (A) with a proton-abstracting base, thereby removing a proton from the heteroatom-attached carbon atom in the heteroatom-attached hydrocarbon group, to form an ylide (B),
(3) reacting ylide (B) at a temperature of from 0 to about 250° C. with an onium salt (C), the anion component of which is derived from a non-oxidizing acid and the cation portion of which is derived from a second heteroatom compound having from 4 to about 12 carbon atoms and 1 heteroatom selected from a group consisting of nitrogen and sulfur, said onium salt having a heteroatom-attached hydrocarbon group of $m$ carbon atoms, where $m$ is a number from 1 to about 10, to form an onium salt (D) of the first heteroatom compound with a heteroatom-attached hydrocarbon group of $m+n$ carbon atoms, and (4) decomposing onium salt (D) at a temperature from about 20° to about 250° C. in the presence of base to produce an olefin of $m+n$ carbon atoms.

10. The process of claim 9 wherein the first heteroatom compound and the second heteroatom compound are the same chemical compound.

11. The process of claim 10 wherein the substituted hydrocarbon is methyl halide.

12. A process for olefin synthesis which comprises
(1) reacting in the liquid phase an olefin having $n$ carbon atoms, where $n$ is a number from 2 to about 20 with a non-oxidizing acid to form a substituted hydrocarbon,
(2) reacting the substituted hydrocarbon of step (1) with a heteroatom compound having from 4 to about 12 carbon atoms and 1 heteroatom selected from a group consisting of nitrogen and sulfur, at a temperature of from −20° to 150° C. in the liquid phase to form an onium salt (A) having a heteroatom-substituted hydrocarbon group of $n$ carbon atoms,
(3) reacting onium salt (A) with a proton-abstracting base, thereby removing a proton from the heteroatom-attached carbon atom in the heteroatom-substituted hydrocarbon group, to form an ylide (B),
(4) reacting ylide (B) with an onium salt (C) of the same heteroatom compound having a heteroatom-attached hydrocarbon group having $m$ carbon atoms where $m$ is a number from 1 to about 10, to form an onium salt (D) with a heteroatom-attached hydrocarbon group of $m+n$ carbon atoms, and
(5) decomposing onium salt (D) at a temperature from about 20° to about 250° C. in the presence of base to produce an olefin of $m+n$ carbon atoms.

13. The process of claim 12 wherein onium salt (A) and onium salt (C) are the same compound.

References Cited

UNITED STATES PATENTS 2,842,599   7/1958   Isler et al. _____ 260—677 X

OTHER REFERENCES

Wittig: Angewandte Chemie, 63 (1951), pp. 15–18.
Wittig et al.: Annalen der Chemie, Band 599 (1956), pp. 1–5.
Cope et al.: "Organic Reactions," vol. 11, pub. by Wiley and Sons, New York (1960), pp. 357–359.

PAUL M. COUGHLAN, JR., *Primary Examiner.*

U.S. Cl. X.R.

260—666, 677